US006804962B1

(12) United States Patent
Prueitt (10) Patent No.: US 6,804,962 B1
(45) Date of Patent: Oct. 19, 2004

(54) SOLAR ENERGY DESALINATION SYSTEM

(76) Inventor: Melvin L. Prueitt, 161 Cascabel, Los Alamos, NM (US) 87544

( * ) Notice: Subject to any disclaimer, the term of this patent is extended or adjusted under 35 U.S.C. 154(b) by 621 days.

(21) Appl. No.: 09/746,725

(22) Filed: Dec. 21, 2000

Related U.S. Application Data (60) Provisional application No. 60/172,094, filed on Dec. 23, 1999.

(51) Int. Cl.[7] .............................................. B60K 16/00
(52) U.S. Cl. .......................... 60/641.8; 60/39.6; 60/671
(58) Field of Search .............................. 60/641.8, 39.6, 60/670, 671; 123/201, 243

(56) References Cited

U.S. PATENT DOCUMENTS

| | | | |
|---|---|---|---|
| 3,558,242 A | 1/1971 | Jenkyn-Thomas | 417/374 |
| 4,367,140 A | 1/1983 | Wilson | 210/110 |
| 4,504,362 A | 3/1985 | Kruse | 203/3 |
| 4,883,823 A | 11/1989 | Perry, Jr. et al. | 518/702 |
| 4,973,408 A * | 11/1990 | Keefer | 210/652 |
| 5,004,535 A | 4/1991 | Bosko et al. | 210/90 |
| 5,193,988 A | 3/1993 | Solomon | 417/403 |
| 5,306,428 A | 4/1994 | Tonner | 210/652 |
| 5,462,414 A | 10/1995 | Permar | 417/313 |
| 5,507,943 A | 4/1996 | Labrador | 210/136 |
| 5,645,693 A | 7/1997 | Gode | 202/173 |
| 5,672,250 A | 9/1997 | Ambadar et al. | 202/169 |
| 5,685,152 A | 11/1997 | Sterling | 60/641.8 |
| 5,775,107 A * | 7/1998 | Sparkman | 60/641.8 |
| 5,797,429 A | 8/1998 | Shumway | 137/625.69 |
| 6,017,200 A | 1/2000 | Childs et al. | 417/404 |
| 6,313,545 B1 * | 11/2001 | Finley et al. | 290/54 |
| 6,401,686 B1 * | 6/2002 | Prueitt et al. | 123/201 |
| 6,470,683 B1 * | 10/2002 | Childs et al. | 60/641.8 |
| 6,497,090 B2 * | 12/2002 | Bronicki et al. | 60/39.6 |

* cited by examiner

*Primary Examiner*—Hoang Nguyen
(74) *Attorney, Agent, or Firm*—Rod D. Baker; Peacock Myers & Adams, P.C.

(57) ABSTRACT

A desalination system is driven by a solar powered boiler that outputs a pressurized vapor to drive an expander that generates output motive force. A pump is responsive to the motive force to output pressurized saline water. A reverse osmosis unit receives the pressurized saline water to output fresh water and pressurized brine. A recuperator that transfers heat from the expander exhaust to the boiler feed liquid is incorporated to improve the efficiency of the system. In a particular embodiment, a hydraulic motor receives the pressurized brine and outputs an augmenting motive force to the pump. In another embodiment, a novel motorless boiler feed pump is defined.

25 Claims, 6 Drawing Sheets

SOLAR ENERGY DESALINATION SYSTEM

This application claims benefit of 60/172,094 Dec. 23, 1999.

BACKGROUND OF THE INVENTION

1. Field of the Invention (Technical Field)

The present invention relates generally to desalination of brine, and, more particularly, to the use of solar energy to drive a reverse osmosis plant.

2. Background Art

The global need for high quality water is acute. A serious obstacle to fresh water production is the energy cost. Solar energy is free, but devices that harness that energy can be expensive, and the use of the energy is usually inefficient. A solar still, for example, requires over 500 calories of heat to distill one gram of water.

The present invention, called Solar Energy Desalination System (SEDS), provides a way to desalinate seawater or brackish water economically. It operates optimally in areas of abundant sunshine.

Most desalination methods that use solar energy utilize the heat of the sun to provide the thermal energy to evaporate seawater in a flash distillation plant. For example, U.S. Pat. No. 5,672,250 teaches such a method. U.S. Pat. Nos. 4,504,362 and 5,645,693 teach focusing sunlight with mirrors to achieve higher temperature for boiling seawater.

U.S. Pat. No. 5,507,943 shows a method of desalinating seawater using wave motion to oscillate a float attached to a lever arm that drives a piston to pump seawater into a reverse osmosis (RO) device. It uses solar energy indirectly, since the waves are driven by sun-powered wind.

U.S. Pat. No. 5,004,535 shows the use of a solar photovoltaic power source that drives a motor and pump to force water into a reverse osmosis unit.

U.S. Pat. Nos. 3,558,242, 4,367,140, 5,193,988, 5,306,428, 5,462,414, 5,797,429, and 6,017,200 employ piston means to recover some of the energy of the rejected brine. The pistons are driven by external sources of power.

U.S. Pat. No. 4,883,823 shows a system that can use solar energy to boil a low-boiling-point working fluid to drive pistons that pump seawater into a reverse osmosis desalination unit. When the high-pressure working fluid vapor drives a piston for this type of application, it does so at essentially constant pressure. When the exhaust valve opens, the vapor exits the cylinder in a free expansion with little drop in temperature. Since the vapor is still hot, its heat energy can be used to preheat the liquid feed to the boiler in a recuperator (heat exchanger). Patent 4,883,823 and similar prior art do not show such a recuperator, resulting in lower efficiency of the system. The present invention does incorporate a recuperator.

The present invention also incorporates a novel motorless boiler feed pump. U.S. Pat. No. 5,685,152 presents a solar power system which contains a motorless boiler feed pump. One of the disadvantages of this design is that the condenser must be located above the boiler in order for the liquid flow from the condenser to gravity flow into an intermediate tank and then gravity flow into the boiler. Another disadvantage is that the intermediate tank must be cooled in order for the cooled liquid to flow into it without vaporizing vigorously. Then when the valve is opened to allow the liquid to flow into the boiler, high-pressure vapor from the boiler rushes into the intermediate tank and condenses on the cool walls. This represents a significant loss of energy.

In one embodiment of the present invention, a particular type of "motor, expander, compressor, or hydraulics" system, hereinafter referred to as "MECH", is incorporated in the apparatus. The MECH apparatus and functions are disclosed in copending U.S. patent application Ser. No. 09/715,751, entitled "Apparatus Using Oscillating Rotating Pistons" filed on Nov. 16, 2000, the disclosure of which is herein incorporated.

Various objects, advantages and novel features of the present invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention is directed to a desalination system. A solar powered boiler outputs a pressurized vapor to drive an expander that generates output motive force. A pump is responsive to the motive force to output pressurized seawater or brackish water. A reverse osmosis unit receives the pressurized seawater to output fresh water and pressurized brine. In a particular embodiment, a hydraulic motor receives the pressurized brine and outputs an augmenting motive force to the pump. A heat recuperator transfers heat from expander exhaust gas to boiler feed liquid. In another embodiment, the boiler feed liquid is pumped by a novel motorless feed pump.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS AND BEST MODE FOR PRACTICING THE INVENTION

This invention utilizes solar energy to boil a working fluid. High-pressure vapor from a boiler drives an expander, such as a piston device, a rotary vane motor, turbine, or other expander to drive a high-pressure pump that feeds brackish water (e.g., seawater and the like) into a reverse osmosis plant where some of the water is forced through an osmotic membrane to produce fresh water. In this disclosure and in the claims, "salty water" and "seawater" are used interchangeably, and both terms refer to the feed water that is desalinated by the invention. The water that does not flow through the membrane carries residual salt and becomes a more concentrated brine. This brine is still under high pressure. Its energy is recovered in a hydraulic recovery motor or by a direct-acting piston device.

Figure 1:
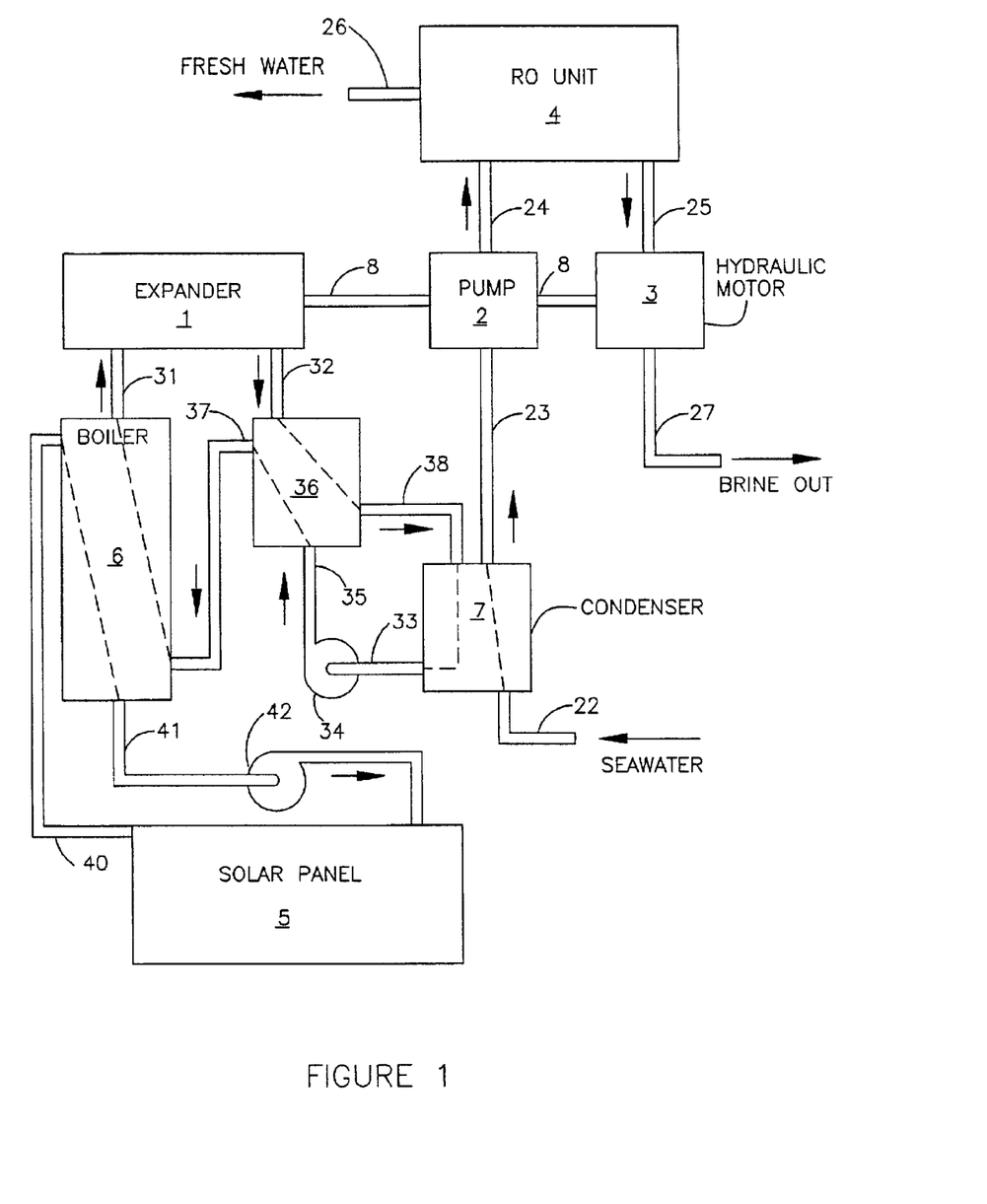
FIG. 1 is a schematic of a solar energy driven desalination system according to one embodiment of the present invention.

Referring to FIG. 1, solar panel 5 collects thermal energy in a fluid, which could be water, air, or other fluid. The following discussion assumes that water is used. The water flows via pipe 40 into boiler 6, which is a heat exchanger of any conventional type that transfers heat from the water into a low-boiling point working fluid, such as a refrigerant. (If some fluid other than water is used to collect heat in the solar collector, then water might be used as the working fluid that is boiled in the boiler). The working fluid boils at high pressure, and the resulting vapor flows through pipe 31 into expander 1. Expander 1 can be a turbine or other type of mechanical expander. Expander 1 extracts energy from the vapor and translates it into rotary motion of shaft 8.

Main shaft 8 drives high-pressure pump 2 that draws seawater from pump intake pipe 23 and forces the seawater into osmosis unit intake pipe 24 and into reverse osmosis (RO) unit 4. In RO unit 4, part of the high-pressure water is forced through osmotic membranes to yield fresh water, which exits through delivery pipe 26. The remaining brine, still at high pressure, flows through osmosis unit outlet pipe 25 into hydraulic motor 3 for the purpose of recovering some of the pumping energy expended in pump 2. It is seen, therefore, that the hydraulic motor 3 is in operable connection with the pump 2 and is responsive to the pressure of the pressurized brine, so that said hydraulic pump imparts an augmenting motive force, derived from the energy of the brine, to the pump. Recovered energy is transmitted through shaft 8 (which is a continuation of the main shaft from the expander 1) back to pump 2. The brine exits through discharge pipe 27. The brine may be diluted by seawater before discharging into the ocean to prevent ecological damage.

The working fluid vapor exits expander 1 through expander outlet pipe 32 and flows through recuperator 36, where it is cooled by heat exchange with working fluid liquid flowing from the condenser 7. The vapor then flows through pipe 38 into condenser 7 where it condenses to a liquid as it transfers heat to the comparatively cooler feed water, e.g. seawater, from condenser intake pipe 22. The working fluid liquid is then pumped via condenser outlet pipe 33 by recuperator pump 34 through pipe 35 to recuperator 36, where it is preheated before it flows through boiler return pipe 37 back to the boiler 6. Utilizing the heat from the expander exhaust to preheat the working fluid before it enters the boiler 6 increases efficiency of the overall inventive apparatus. Inlet seawater (condenser intake pipe 22) exits condenser 7 via pump intake pipe 23 and flows into pump 2.

Solar heated water leaves boiler 6 through boiler outlet pipe 41 and is pumped by collector pump 42 back to the solar panel 5 to be reheated.

Figure 2:
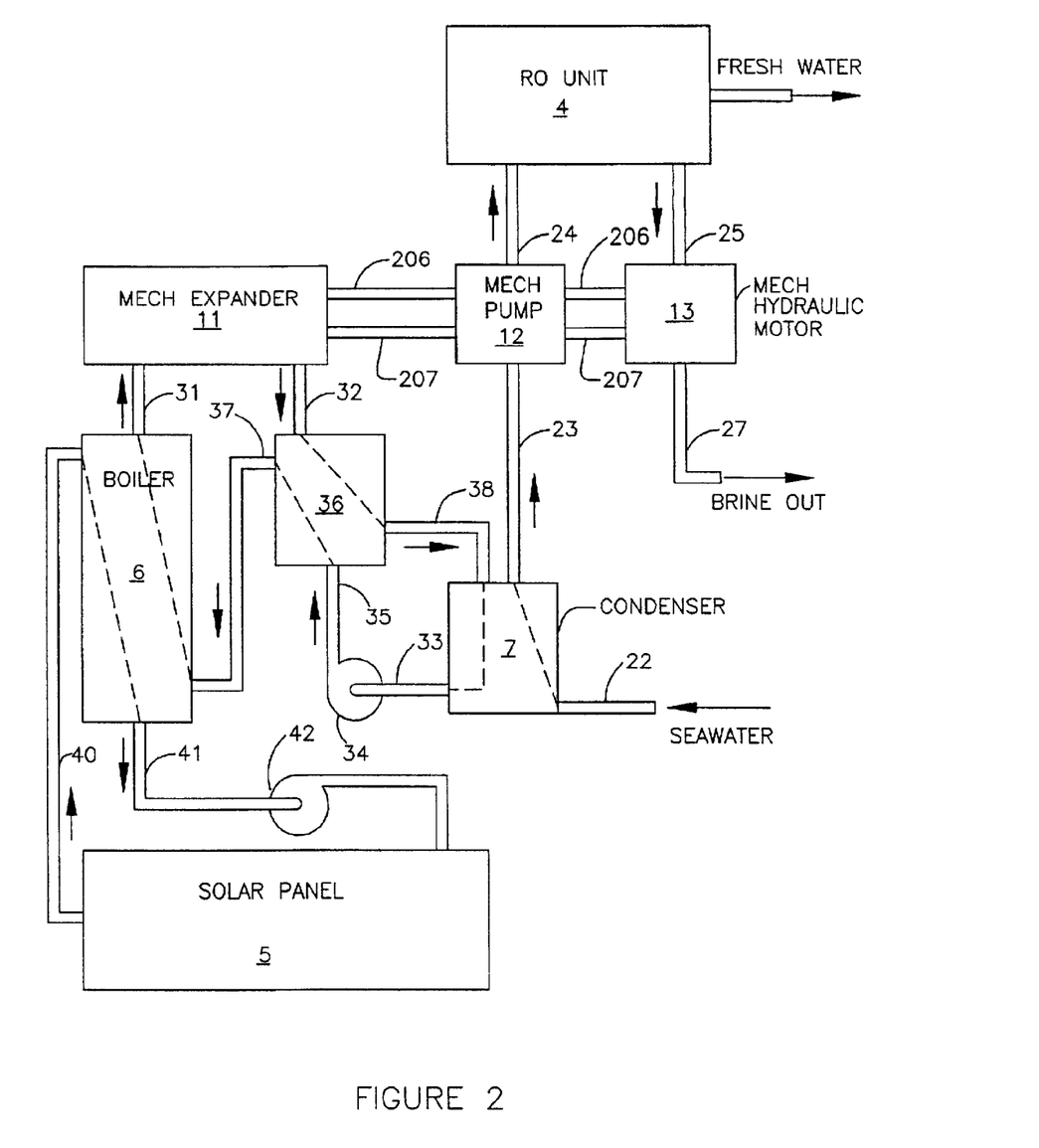
FIG. 2 is a schematic of a solar energy driven desalination system according to a second embodiment of the present invention that uses a MECH expander and MECH pumps.

FIG. 2 shows an alternative system using a MECH Expander 11, MECH Pump 12, and MECH Hydraulic Motor 13. MECH (described below) is an acronym for Motor, Expander, Compressor, Hydraulics, where the MECH components use oscillating rotating pistons as described in U.S. patent application Ser. No. 09/715,751. Components in FIG. 2 having the same reference numerals as FIG. 1 components are as discussed for FIG. 1.

MECH devices 11, 12, 13 use rotating pistons that are all attached to shafts 206 and 207. The embodiment shown in FIG. 2 employs two rotating pistons per MECH device. High-pressure working vapor enters MECH Expander 11 from expander intake pipe 31, drives the rotating pistons therein in a reciprocating manner, and these pistons rotate shafts 206 and 207 to drive the rotating pistons in MECH Pump 12, which force seawater from pump intake pipe 23 into the RO unit 4 via osmosis unit intake pipe 24, as previously described in reference to the embodiment of FIG. 1. It is seen, therefore, and with additional reference to FIG. 3, that the pressurized vapor enters a high pressure region in the expander 11 to transmit energy to the rotating pistons of the expander. The brine flows from RO unit 4 into MECH Hydraulic Motor 13, which returns some of the energy to pump 12 via shafts 206 and 207. Thus, the pressurized brine enters a high pressure region in the MECH hydraulic motor 13 thereby to transmit pressure energy from the brine to the rotating pistons of the motor.

The rotating piston lengths in hydraulic motor 13 are shorter than the rotating pistons in pump 12, since the hydraulic motor is handling a smaller volume of water. If the rotating pistons of pump 12 are the same length as the pistons of expander 11, the pressure of the water flowing in osmosis unit intake pipe 24 will be greater than the vapor pressure differential between expander intake pipe 31 and expander outlet pipe 32, since the pump 12 is also being driven by hydraulic motor 13. If it is desirable to increase the pressure of the water in the osmosis unit intake pipe 24 further, the rotating pistons of pump 12 can be made shorter than the rotating pistons of expander 11.

Figure 3:
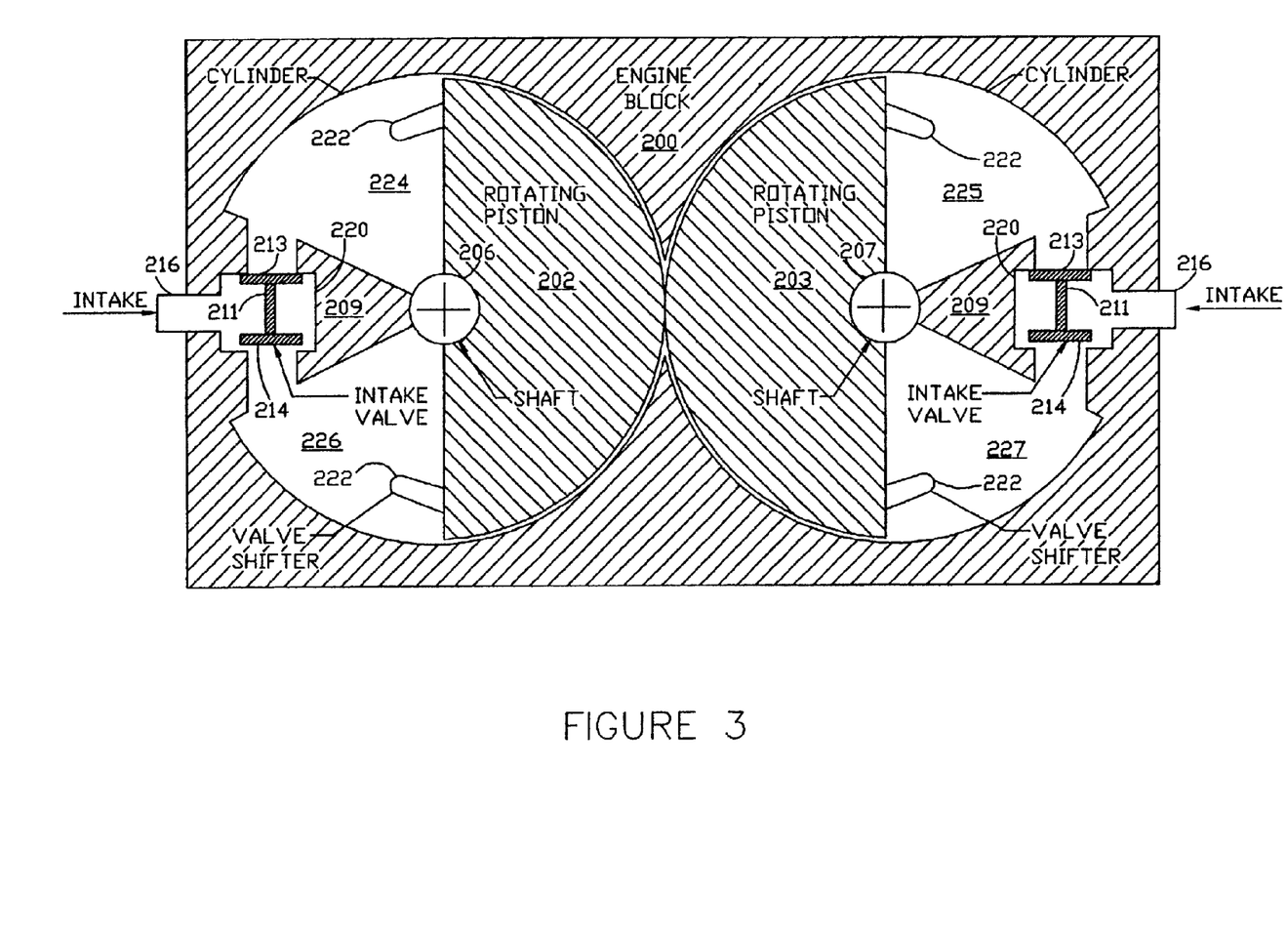
FIG. 3 is a radial cross sectional view of a MECH expander.

FIG. 3 is a cross sectional view of a MECH expander typifying the expander 11 seen in FIG. 11. A MECH type hydraulic motor (e.g. element 13 in FIG. 2) can be configured similarly, and the detailed operation thereof is explained in U.S. patent application Ser. No. 09/715,751. The rotating pistons 202 and 203 are hemi-cylindrical in cross section. They roll together to form a seal to prevent fluids from flowing from high to low pressure regions. Friction is greatly reduced compared to a standard piston engine, since the rotating pistons do not touch the cylinder walls of engine block 200. Rolling friction is much less than sliding friction. Rotating piston 202 rotates counterclockwise as rotating piston 203 rotates clockwise as high-pressure fluid flows through intakes 216 into chambers 226 and 227. At the end of the stroke, valve shifters 222 strike valves 213. This causes valves 213 to open, while closing valves 214 by the transmitted force through shaft 211. With valves 213 open, the high-pressure fluid flows into chambers 224 and 225 and causes the rotating pistons 202 and 203 to reverse direction of rotation. When valve shifters 222 strike valves 214, rotation direction is again reversed, and the cycle is repeated. Exhaust valves are not shown, since they are located "beyond" the intake valves in the drawing. The exhaust valves are also actuated by valve shifters.

Alternatively, other types of valves, such as spool valves, rotary valves, or electrically operated valves, may be used in place of the valves shown.

Continued reference is made to FIG. 3. Wedge shaped bodies 210 and 209 prevent the flow of fluids between the upper and lower chambers in the drawing. Valve assemblies 220 are mounted in the bodies 209.

Shafts 206 and 207 are fixed to the rotating pistons 202, 203 and exit the expander 11 through end plates where they are attached to gearwheels (not shown) that mesh together to maintain proper alignment between the two rotating pistons.

A MECH pump 12 appears and functions similar to the MECH expander, but in a pump, the valves of FIG. 3 are replaced by pairs of check valves for each of the chambers 224, 225, 226, and 227. One of the check valves of each pair would allow fluid to enter the chamber on intake, and the other would allow fluid to exit the chamber during exhaust.

Figure 4:
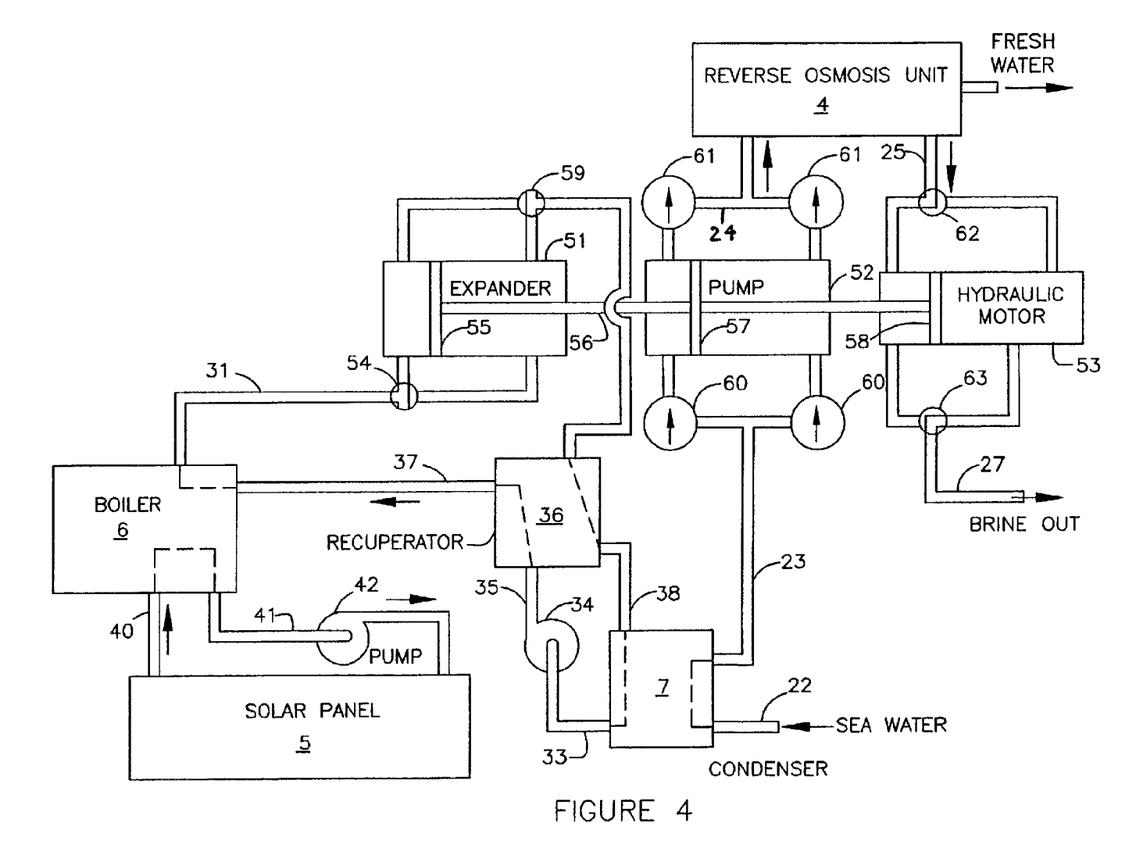
FIG. 4 schematically illustrates a system for producing fresh water from high-pressure seawater and recovering energy from the brine using hydraulic cylinders and pistons.

FIG. 4 shows another method to produce high-pressure seawater and recover energy from the brine. High-pressure vapor from boiler 6 flows through expander intake pipe 31 through three-way valve 54 to one side of piston 55 in expander cylinder 51. The vapor pressure moves piston 55 (e.g. to the right in FIG. 4). The motion of piston 55 is transmitted via rod 56 to piston 57 in pump cylinder 52. The motion of piston 57 within pump cylinder 52 pumps seawater out through check valves 61 into osmosis intake pipe 24 on the way to an RO unit 4. The motion of the piston 57 also draws seawater into the cylinder 52 through check valves 60 from pump intake pipe 23.

As the piston 55 in the expander cylinder 51 moves, it forces vapor out of one side of cylinder 51 through three-way valve 59. At the end of the stroke of piston 55, valves 54 and 59 are switched so that high-pressure vapor is applied to the opposite side of the piston 55 thereby reversing the piston's direction of motion. The switching of valve 59 allows vapor to move from cylinder 51 through recuperator 36 to condenser 7.

High-pressure brine from an RO unit 4 flows through osmosis unit outlet pipe 25 and through three-way valve 62 to force piston 58 in hydraulic motor cylinder 53 to move in concert with the expander piston 55. Hydraulic motor piston 58 augments expander piston 55 to move pump piston 57 and increases the efficiency of the system. Brine on the low-pressure side of piston 58 is forced out through three-way valve 63 into discharge pipe 27 to be discharged.

Three-way valves 54, 59, 62, and 63 are operated by a conventional control mechanism (which is not shown) based on the position of any one of pistons 55, 57, or 58. The valves may be mechanically actuated by the motion of rod 56, or they may be actuated electrically. The embodiment of FIG. 4 in other respects is substantially similar to the embodiment seen in FIGS. 1 and 2, with analogous components labeled with corresponding reference numerals in both drawing figures.

Figure 5:
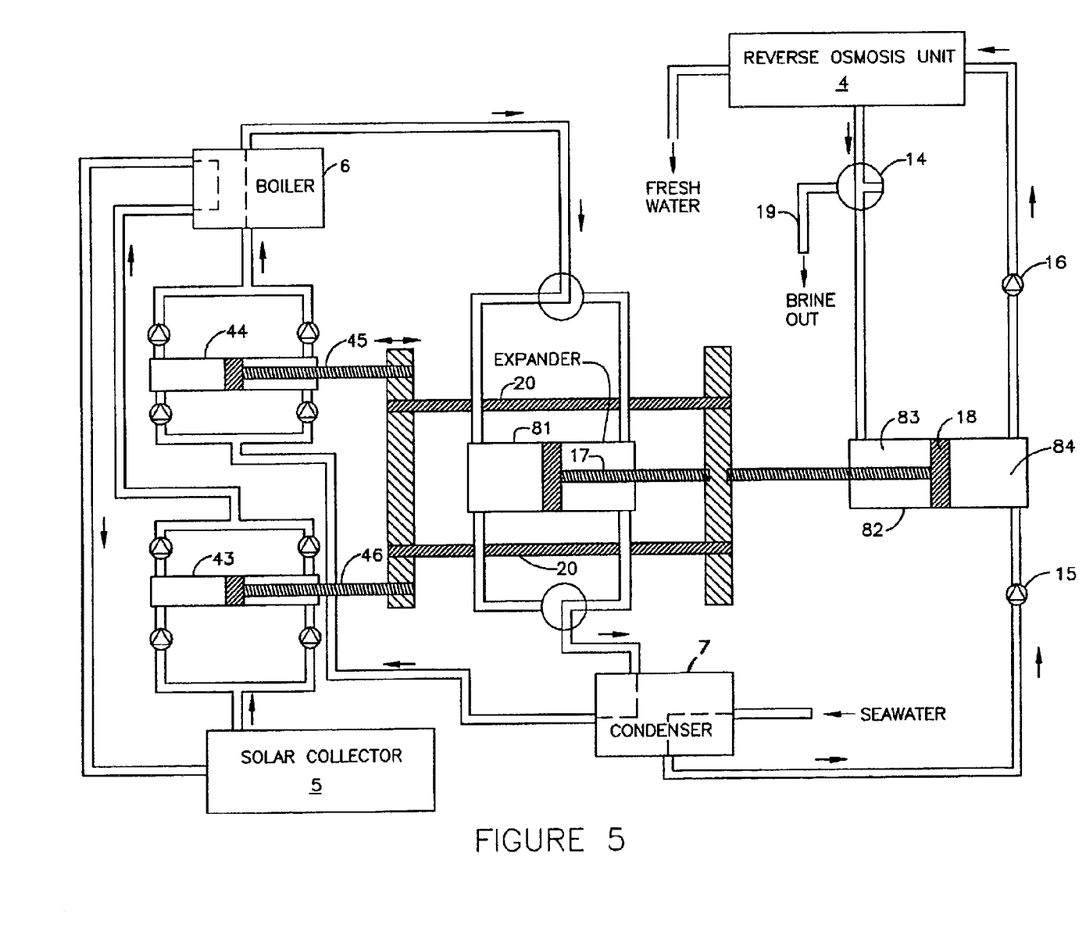
FIG. 5 shows another arrangement of hydraulic cylinders including pumps for liquid working fluid and for solar collector fluid.

FIG. 5 shows another arrangement for hydraulic cylinders. Expander 81 drives main shaft 17 to move piston 18 in hydraulic cylinder 82. When piston 18 moves to the right in the drawing, brine from the RO unit 4 flows under pressure through three-way valve 14 into chamber 83, and the seawater is forced out through check valve 16 into the RO unit 4. Note that the high-pressure brine flowing into chamber 83 helps to move piston 18 in forcing seawater out of chamber 84 and into the RO unit 4. When the piston 18 moves to the left, brine in chamber 83 is forced out through three-way valve 14 to be discharged through pipe 19, and sea water is drawn into chamber 84 through check valve 15.

Rods 20 connect shaft 17 to secondary shafts 45 and 46 that actuate secondary pumps 43 and 44. Secondary pump 43 pumps water from the solar collector 5 through check valves to the boiler 6. Secondary pump 44 pumps liquid working fluid from the condenser 7 through check valves to the boiler 6. For the sake of clarity of the drawing, the recuperator 36 of FIG. 1 is not shown in FIG. 5, but its incorporation in the device is to be understood and is important.

The embodiment of FIG. 5, like all the embodiments of the invention, very preferably features a solar collector 5 for heating a fluid for conveyance to the boiler 6. The first secondary pump and the second secondary pump each has its piston movable within a respective cylinder 43, 44, while the secondary shafts 45, 46 operably connect the pistons to the main shaft 17. Consequently, when the pressurized vapor moves the piston within the first cylinder 81 to impart movement to the main shaft 17, motion is imparted to the pistons in the pumps by the secondary shafts 45, 46, so that the pumps move fluids to and from the boiler 6 and the solar collector 5, respectively.

The recuperator 36 is especially important in the expanders of FIGS. 2, 4, and 5, since the working fluid vapor does work at constant pressure. When the exhaust valve is opened, a free expansion of the vapor occurs with little loss in enthalpy. The heat of the vapor can be used in the recuperator 36 to preheat the boiler feed liquid.

Figure 6:
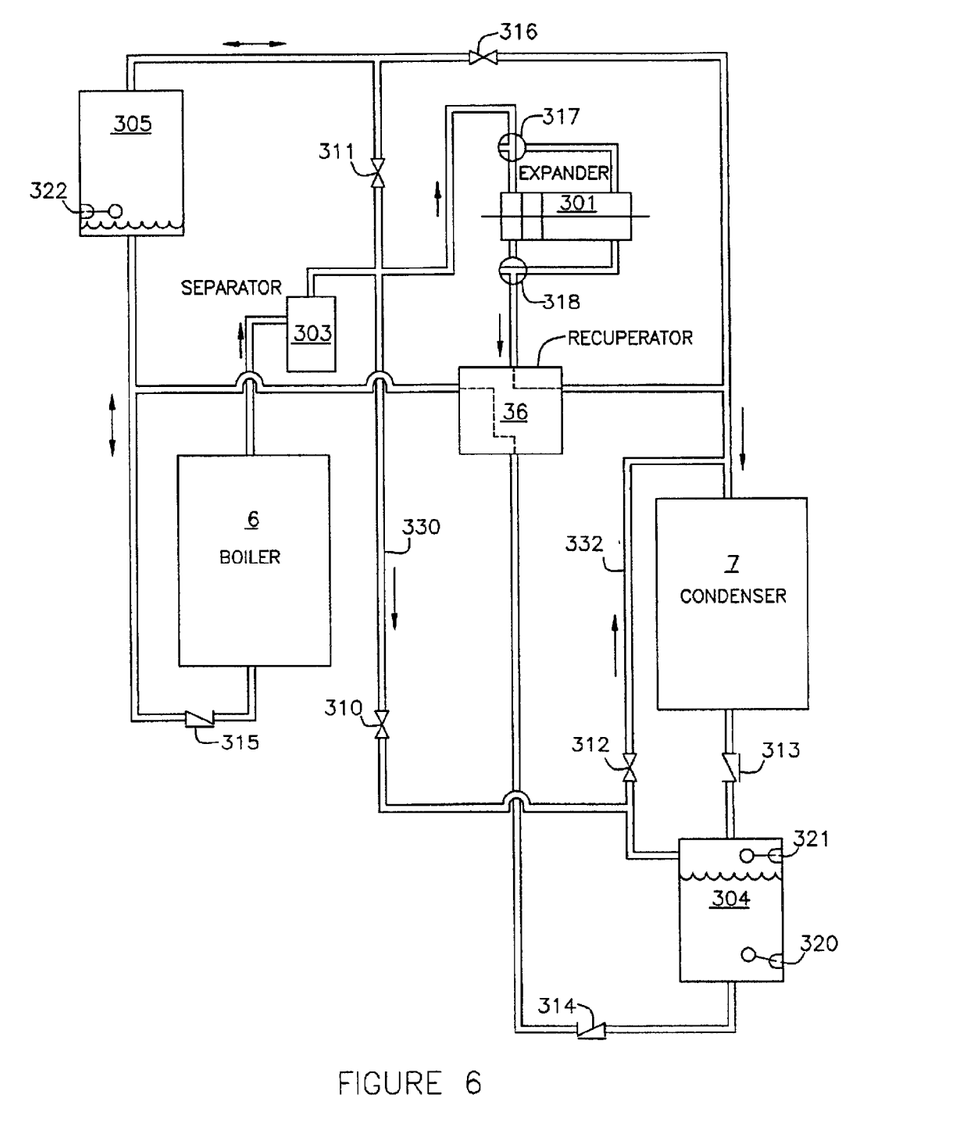
FIG. 6 is a schematic of a motorless liquid feed pump.

FIG. 6 shows a schematic diagram of yet another embodiment of the invention featuring a motorless boiler feed pump that is effective to move the condensed liquid from the condenser 7 to the boiler 6. This motorless pump can be used in any of the embodiments of the invention described in this disclosure. As the working fluid vapor condenses in condenser 7, the resulting condensate drains through check valve 313 into tank 304. Check valve 313 thus permits working fluid liquid to enter the second tank 304, but prevents working fluid vapor from back-flowing from the second tank to the condenser 7. When the tank 304 becomes full of working fluid liquid, first switch 321 closes and sends a signal to an electrical control circuit (not shown) that opens pump valve 310 and condenser valve 316 and simultaneously closes release valve 312 and boiler valve 311. High pressure vapor from the boiler flows through separator 303, pipe 330, and pump valve 310 and creates high pressure above the liquid in tank 304.

The walls of both first tank 304 and second tank 305 are lined with insulating material. The high pressure vapor immediately begins to condense on the walls of tank 304 and on the surface of the cool liquid. Condensation of the vapor deposits heat, which increases the temperature of the surface of the insulation layer on the walls. Increase in temperature of the liquid that condenses on the walls of tank 304 increases the vapor pressure of the liquid. Once this vapor pressure matches the pressure of the incoming vapor, condensation within the tank 304 nearly ceases. Condensation does not entirely cease, because some heat is being conducted away through the insulating layer. Likewise, condensation of vapor on the surface of the liquid pool in the tank 304 heats a thin top layer of the liquid until the vapor pressure of the liquid matches the pressure of the incoming vapor. Since the liquid is a poor conductor, not much of the vapor condenses.

As the liquid is forced out of tank 304, it flows through check valve 314 and through recuperator 36 to second tank 305. In the recuperator, the liquid picks up heat from the exhaust vapor from the expander 301. Since condenser valve 316 is open, the vapor in second tank 305 flows to the low-pressure condenser 7. When first tank 304 is empty, second switch 320 is actuated and sends a signal that opens release valve 312 and boiler valve 311 and closes valves 310 and 316. The high-pressure vapor then escapes from tank 304 through release valve 312 to the top of the condenser 7. High pressure vapor from the boiler 6 flows through boiler valve 311 into tank 305 and allows the liquid in tank 305 to gravity flow through check valve 315 back into the boiler 6. The purpose of switch 322 is to prevent the switching of valves that would cause tank 304 to empty until tank 305 is empty.

The switches 320, 321 preferably are customary "float" switches responsive to the physical level of working fluid liquid within the second tank 304. It will be apparent to persons of ordinary skill, however, that other suitable known means for detecting the level of liquid within the second tank 304 may be used and be within the scope of the invention, so that the detected liquid level actuates switches 320, 321 to regulate the valves 310, 311, 312, 316.

It should be noted that this type of motorless feed pump is useful not only for the SEDS apparatus of this disclosure, but also can be used as a feed pump for steam power plants.

Three-way valves 317 and 318, operated by a different electrical circuit than that of the motorless pump valves, control the motion of the piston in the expander cylinder 301.

One of the advantages of using a desalination unit with MECH expanders, pumps, and motors (FIG. 2) instead of a piston-cylinder design is that MECH devices have much less friction, and rotating shafts are much easier to seal than sliding shafts. Refrigeration seals that are commonly used on automotive air-conditioning units are very effective at providing leak-proof seals on rotating shafts.

Wherever there is abundant sunlight and seawater or brackish water, the present invention offers an economical method of desalinating water.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for desalinating salty water comprising:
   a solar panel for collecting solar thermal energy in a liquid;
   a boiler in communication with said panel, wherein thermal energy is transferred in said boiler from said liquid to vaporize a low-boiling-point working fluid, whereby said boiler outputs a pressurized working fluid vapor;
   an expander responsive to the pressurized working fluid vapor to generate an output motive force;
   a pump, responsive to the motive force of said expander, to pressurize and move the salty water to a reverse osmosis unit;
   a reverse osmosis unit for receiving salty water and outputting fresh water and pressurized brine; and
   an hydraulic motor in operable connection with said pump and responsive to the pressure of said pressurized brine, wherein said hydraulic motor imparts an augmenting motive force to said pump.

2. A system according to claim 1 wherein said hydraulic motor comprises at least one pair of rotating pistons in rolling contact to form a seal to prevent fluids from flowing from a region of high pressure to a low pressure region within said hydraulic motor.

3. A system according to claim 2 wherein the pressurized brine enters said high pressure region to transmit energy to said hydraulic motor.

4. A system according to claim 1 wherein said pump comprises at least one pair of rotating pistons in rolling contact to form a seal to prevent fluids from flowing from regions of high pressure to low pressure regions within said pump.

5. A system according to claim 1 wherein said expander comprises at least one pair of rotating pistons in rolling contact to form a seal to prevent fluids from flowing from regions of high pressure to low pressure regions.

6. A system according to claim 5 wherein the pressurized working fluid vapor enters said high pressure region to transmit energy to said expander.

7. A system according to claim 1 wherein said expander comprises a first piston movable within a first cylinder, said pump comprises a second piston movable within a second cylinder, and said hydraulic motor comprises a third piston movable within a third cylinder, wherein said pistons are operably connected by a shaft, and wherein further the pressurized working fluid vapor moves said first piston within said first cylinder and said pressurized brine moves said third piston within said third cylinder, and the movement of said first and third pistons is imparted to said second piston by said shaft.

8. A system according to claim 1 wherein said expander comprises a first piston movable within a first cylinder, and said pump also comprises a hydraulic motor comprising a second piston movable within a second cylinder, wherein said pistons are operably connected by a main shaft, and wherein further the pressurized working fluid vapor moves said first piston within said first cylinder and the movement of said first piston is imparted to said second piston by said main shaft.

9. A system according to claim 8 further comprising a solar collector for heating a liquid for conveyance to said boiler.

10. A system according to claim 9 further comprising:
    a first secondary pump and a second secondary pump, each of said secondary pumps comprising a piston movable within a cylinder;
    secondary shafts operably connecting said pistons in said secondary pumps with said main shaft;
    wherein when the pressurized working fluid vapor moves said first piston within said first cylinder to impart movement to said main shaft, motion is imparted to said pistons in said secondary pumps by said secondary shafts; and wherein further said secondary pumps move fluids to said boiler and said solar collector, respectively.

11. A system according to claim 1, further comprising:
    a recuperator in fluid communication with an exhaust outlet of said expander and;
    a condenser in fluid communication with said recuperator; wherein a working fluid vapor flows from said expander to said recuperator, where the working fluid vapor is cooled by heat exchange with a working fluid liquid flowing from said condenser.

12. A system according to claim 11 wherein the working fluid vapor flows into said condenser where it condenses to a liquid to transfer heat to the salty water, and wherein further the working fluid liquid is pumped to said recuperator where said working fluid is preheated before flowing to said boiler.

13. A system for desalinating salty water comprising:
    a solar collector for collecting solar thermal energy in a liquid;
    a boiler in communication with said collector, wherein thermal energy is transferred in said boiler from said liquid to vaporize a low-boiling-point working fluid, whereby said boiler outputs a pressurized working fluid vapor;
    an expander responsive to the pressurized working fluid vapor to generate an output motive force;
    a reverse osmosis unit for receiving salty water and outputting fresh water and pressurized brine;
    a pump to pressurize and move the salty water to said reverse osmosis unit; and an hydraulic motor in operable connection with said pump and responsive to the pressure of the pressurized brine, wherein said hydraulic motor imparts an augmenting motive force to said pump, and wherein said hydraulic motor comprises at least one pair of rotating pistons in rolling contact to form a seal to prevent fluids from flowing from a region of high pressure to a low pressure region, said regions defined within said hydraulic motor.

14. A system for desalinating salty water comprising:
a boiler that outputs a pressurized vapor;
a solar collector for heating a fluid for conveyance to said boiler;
an expander responsive to the pressurized working fluid vapor to generate an output motive force;
a reverse osmosis unit for receiving salty water and outputting fresh water and pressurized brine;
a pump to pressurize and move the salty water to said reverse osmosis unit;
a condenser in which a working fluid condenses;
a recuperator in fluid communication with said condenser and with an exhaust outlet of said expander wherein a working fluid liquid is preheated in said recuperator before flowing to said boiler; and
means for pumping the working fluid liquid from said condenser to said boiler, said means for pumping comprising:
an insulative first tank in fluid communication with said boiler;
an insulative second tank in fluid communication with said condenser;
a check valve for preventing flow of working fluid vapor from said second tank to said condenser;
a pump valve for regulating the flow of working fluid vapor from said boiler to said second tank;
a condenser valve for regulating the flow of working fluid vapor from said first tank to said condenser;
a release valve for regulating the flow of working fluid vapor from said second tank to said condenser;
a boiler valve for regulating the flow of working fluid vapor from said boiler to said first tank; and
a first switch in said second tank for signaling said pump valve, condenser valve, release valve and boiler valve when said second tank is full of working fluid liquid; and
a second switch in said second tank for signaling said pump valve, condenser valve, release valve and boiler valve when said second tank is empty of working fluid liquid; wherein when working fluid vapor condenses in said condenser, the condensate drains through said check valve into said second tank; and wherein further when said second tank becomes full, said first switch closes to signal the opening of said pump and condenser valves and the closing of said release and boiler valves; and further wherein high pressure working fluid vapor from said boiler then flows to said second tank to pressurize the volume above the working fluid liquid in said second tank to force working fluid liquid from said second tank.

15. A system according to claim 14 wherein working fluid liquid forced from said second tank is forced to said first tank, and further wherein the working fluid vapor in said first tank flows through said condenser valve to said condenser.

16. A system according to claim 15 wherein when said second tank is empty said second switch opens to signal the opening of said release and boiler valves and the closing of said pump and condenser valves, and further wherein the high-pressure working fluid vapor in said second tank flows through said release valve to said condenser, and high pressure working fluid vapor from said boiler flows through said boiler valve into said first tank, thereby allowing the working fluid liquid in said first tank to flow by gravity to said boiler.

17. A system according to claim 14 further wherein a working fluid vapor flows from said expander to said recuperator, where the working fluid is cooled by heat exchange with a working fluid liquid flowing from said condenser.

18. A system according to claim 13 wherein the pressurized brine enters said high pressure region to transmit energy to said motor.

19. A system according to claim 13 wherein said pump is responsive to the motive force of said expander, and comprises at least one pair of rotating pistons in rolling contact to form a seal to prevent fluids from flowing from regions of high pressure to low pressure regions.

20. A system according to claim 19 wherein said expander comprises at least one pair of rotating pistons in rolling contact to form a seal to prevent fluids from flowing from regions of high pressure to low pressure regions.

21. A system according to claim 20 wherein the pressurized vapor enters said high pressure region to transmit energy to said expander.

22. A system according to claim 13 wherein said expander comprises a first piston movable within a first cylinder, said pump comprises a second piston movable within a second cylinder, and said hydraulic motor comprises a third cylinder movable within a third cylinder, wherein said pistons are operably connected by a shaft, and wherein further the pressurized vapor moves said first piston within said first cylinder and said pressurized brine moves the third piston within said third cylinder, and the movement of said first and third pistons is imparted to said second piston by said shaft.

23. A system according to claim 13 further wherein said expander comprises a first piston movable within a first cylinder and said pump also comprises a hydraulic motor comprising a second piston movable within a second cylinder, wherein said pistons are operably connected by a main shaft, and wherein further the pressurized vapor moves said first piston within said first cylinder and the movement of said first piston is imparted to said second piston by said main shaft.

24. A system according to claim 23 further comprising:
a first secondary pump and a second secondary pump, each of said secondary pumps comprising a piston movable within a cylinder;
secondary shafts operably connecting said pistons in said pumps with said main shaft;
wherein when the pressurized vapor moves said first piston within said first cylinder to impart movement to said main shaft, motion is imparted to said second pistons in said pumps by said secondary shafts, and wherein further said pumps move fluids from said solar collector to said boiler, and from said condenser to said boiler, respectively.

25. A system according to claim 14 wherein the working fluid flows into said condenser where it condenses to a liquid to transfer heat to the salt water, and wherein further the working fluid liquid is pumped to said recuperator where said working fluid is preheated before flowing to said boiler.

* * * * *